(12) United States Patent
Chen et al.

(10) Patent No.: US 9,501,393 B2
(45) Date of Patent: Nov. 22, 2016

(54) DATA STORAGE SYSTEM GARBAGE COLLECTION BASED ON AT LEAST ONE ATTRIBUTE

(71) Applicant: Western Digital Technologies, Inc., Irvine, CA (US)

(72) Inventors: Albert H. Chen, Redmond, WA (US); James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 94 days.

(21) Appl. No.: 14/538,513

(22) Filed: Nov. 11, 2014

(65) Prior Publication Data

US 2015/0212938 A1    Jul. 30, 2015

Related U.S. Application Data

(60) Provisional application No. 61/932,113, filed on Jan. 27, 2014.

(51) Int. Cl.
*G06F 12/02* (2006.01)
*G06F 3/06* (2006.01)

(52) U.S. Cl.
CPC ......... *G06F 12/023* (2013.01); *G06F 3/0649* (2013.01); *G06F 12/0253* (2013.01); *G06F 2212/1044* (2013.01)

(58) Field of Classification Search
CPC .............. G06F 12/0253; G06F 3/0646; G06F 3/0647; G06F 3/0649; G06F 2212/1044
See application file for complete search history.

(56) References Cited

U.S. PATENT DOCUMENTS

| | | |
|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |

(Continued)

OTHER PUBLICATIONS

International Search Report and Written Opinion dated Apr. 13, 2015 from related PCT Serial No. PCT/US2015/012689, 13 pages.

(Continued)

*Primary Examiner* — Hal Schnee

(57) ABSTRACT

Managing data in a data storage system including at least one Data Storage Device (DSD) and a host. An initial location is determined for data to be stored in the at least one DSD based on at least one attribute defined by the host. A source portion is identified from a plurality of source portions in the at least one DSD for a garbage collection operation based on the at least one attribute defined by the host. A destination portion is identified in the at least one DSD for storing data resulting from the garbage collection operation based on the at least one attribute defined by the host. Garbage collection of the data in the source portion is performed into the destination portion, and after completion of garbage collection, the source portion is designated as a new destination portion for a new garbage collection operation.

36 Claims, 10 Drawing Sheets

(56) References Cited

U.S. PATENT DOCUMENTS

| | | |
|---|---|---|
| 6,145,052 A | 11/2000 | Howe et al. |
| 6,175,893 B1 | 1/2001 | D'Souza et al. |
| 6,178,056 B1 | 1/2001 | Cloke et al. |
| 6,185,063 B1 | 2/2001 | Cameron |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |

(56) References Cited

U.S. PATENT DOCUMENTS

| | | |
|---|---|---|
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,443,630 B2 | 10/2008 | Lengsfield, III et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,486,460 B2 | 2/2009 | Tsuchinaga et al. |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,620,772 B1 | 11/2009 | Liikanen et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |

(56) References Cited

U.S. PATENT DOCUMENTS

| | | |
|---|---|---|
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,521,972 B1 | 8/2013 | Boyle et al. |
| 8,527,544 B1 | 9/2013 | Colgrove et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2002/0194210 A1 | 12/2002 | Subramoney et al. |
| 2005/0069298 A1 | 3/2005 | Kasiraj et al. |
| 2005/0071537 A1 | 3/2005 | New et al. |
| 2006/0232874 A1 | 10/2006 | Tsuchinaga et al. |
| 2007/0156794 A1* | 7/2007 | Kisley .............. G06F 17/30067 |
| 2007/0223182 A1 | 9/2007 | Tsuchinaga |
| 2009/0113702 A1 | 5/2009 | Hogg |
| 2009/0129163 A1* | 5/2009 | Danilak .............. G11C 16/349 |
| | | 365/185.09 |
| 2010/0306551 A1 | 12/2010 | Meyer et al. |
| 2011/0225346 A1 | 9/2011 | Goss et al. |
| 2011/0225347 A1* | 9/2011 | Goss .................. G06F 12/0246 |
| | | 711/103 |
| 2011/0226729 A1 | 9/2011 | Hogg |
| 2011/0264843 A1* | 10/2011 | Haines ............... G06F 12/0246 |
| | | 711/103 |
| 2011/0283049 A1 | 11/2011 | Kang et al. |
| 2011/0302477 A1* | 12/2011 | Goss .................. G06F 11/1068 |
| | | 714/773 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0067136 A1* | 3/2013 | Bates ..................... G06F 12/00 |
| | | 711/103 |
| 2013/0080689 A1* | 3/2013 | Jo ....................... G06F 12/0246 |
| | | 711/103 |
| 2013/0117501 A1* | 5/2013 | Yun ..................... G06F 12/0246 |
| | | 711/103 |
| 2013/0173854 A1* | 7/2013 | Shim .................. G06F 12/0246 |
| | | 711/103 |

(56) References Cited

U.S. PATENT DOCUMENTS

| | | | |
|---|---|---|---|
| 2013/0232308 A1* | 9/2013 | Yairi | G06F 1/14 |
| | | | 711/156 |
| 2013/0311741 A1 | 11/2013 | Tene et al. | |
| 2014/0201424 A1 | 7/2014 | Chen et al. | |
| 2014/0281127 A1* | 9/2014 | Marcu | G06F 12/0246 |
| | | | 711/103 |
| 2015/0301932 A1* | 10/2015 | Oh | G06F 11/00 |
| | | | 711/102 |

OTHER PUBLICATIONS

Ji-Yong Shin, et al., Contention-Oblivious Disk Arrays for Cloud Storage, Cornell University* Microsoft Research* Google, Proceedings of the USENIX conference on File and Storage Technologies (FAST), 2013, pp. 285-297.

Ji-Yong Shin, et al., A Contention-Oblivious Design for Cloud Storage, Cornell University, HotStorage Talk, Jun. 13, 2012, pp. 1-9.

* cited by examiner

DATA STORAGE SYSTEM GARBAGE COLLECTION BASED ON AT LEAST ONE ATTRIBUTE

CROSS-REFERENCE TO RELATED APPLICATION

This application claims the benefit of U.S. Provisional Application No. 61/932,113, filed on Jan. 27, 2014, which is hereby incorporated by reference in its entirety.

BACKGROUND

Data storage devices (DSDs) are often used with a host in a data storage system to record data on or to reproduce data from a recording media. As one type of DSD, a disk drive can include a rotating magnetic disk and a head actuated over the disk to magnetically write data to and read data from the disk. Such disks include a plurality of radially spaced, concentric tracks for recording data.

Shingled Magnetic Recording (SMR) has been introduced as a way of increasing the amount of data that can be stored in a given area on a disk by increasing the number of Tracks Per Inch (TPI). SMR increases TPI by using a relatively wide shingle write head to overlap tracks like roof shingles. The non-overlapping portion then serves as a narrow track that can be read by a narrower read head.

Although a higher number of TPI is ordinarily possible with SMR, the overlap in tracks can create a problem when writing data since new writes to a previously overlapped track affects data written in the overlapping track. For this reason, tracks are sequentially written to avoid affecting previously written data.

Managing sequentially written data for SMR media typically includes the DSD using an indirection system to translate between different addressing schemes to ensure that data is sequentially written. When data is modified for a particular Logical Block Address (LBA), the indirection system allows the DSD to sequentially write the modified data to a new location and remap the LBA for the data to the new location. The old version of the data at the previous location becomes obsolete or invalid data.

In order to free up space on the disk, a Garbage Collection (GC) process can be performed to make the portions of the disk storing invalid or obsolete data available for storing valid data. This can be accomplished during a GC process by relocating the valid data from a particular area on the disk and leaving invalid data to be overwritten. Other types of storage media using indirection, such as solid-state memory, may also use GC to free up portions of the memory storing invalid data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
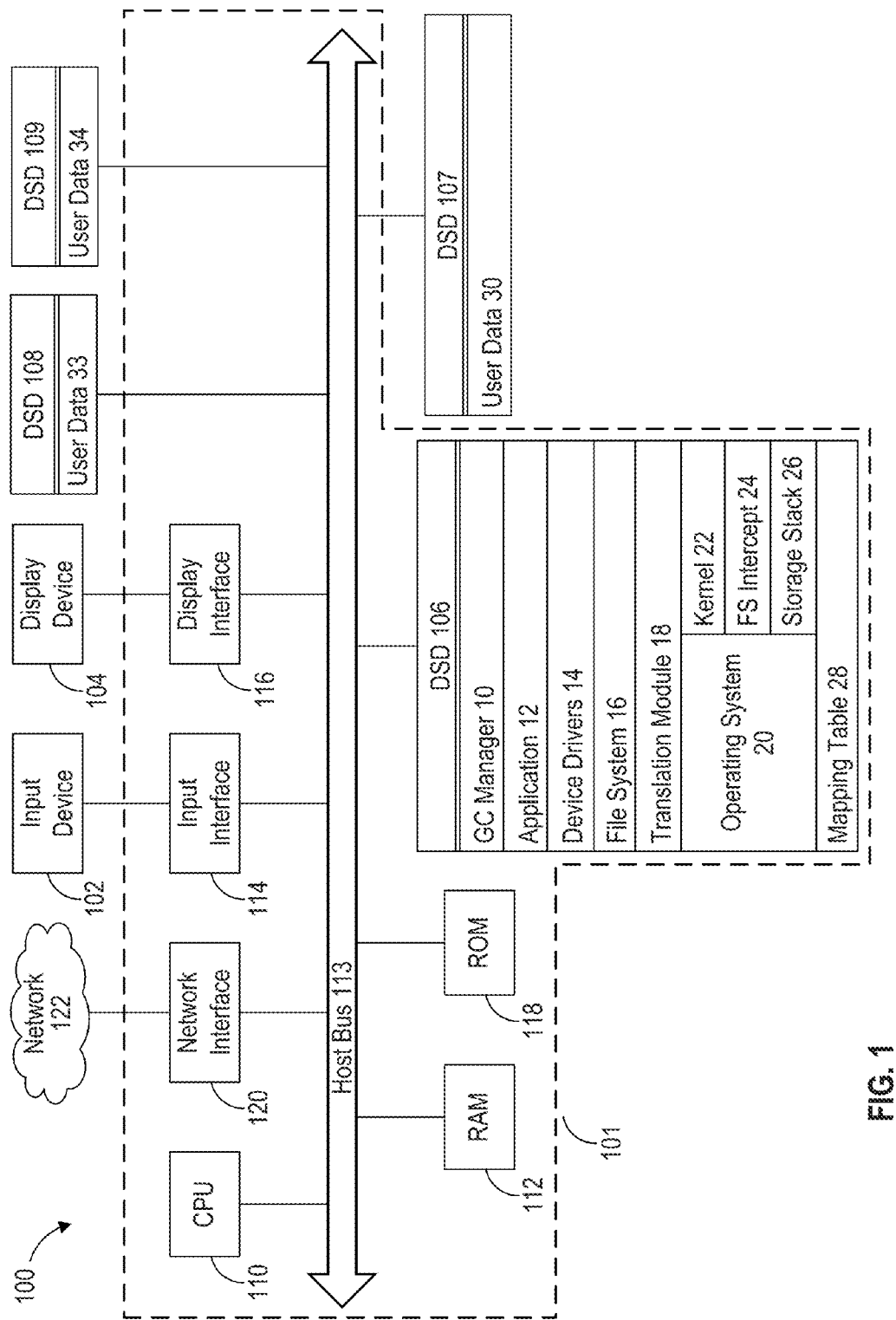
FIG. 1 is a block diagram depicting a data storage system according to an embodiment.

FIG. 1 shows data storage system 100 according to an embodiment that includes host 101 and Data Storage Devices (DSDs) 107, 108, and 109. System 100 can be, for example, a computer system (e.g., server, desktop, cloud storage device, data archiving system, etc.) or other electronic device such as a Digital Video Recorder (DVR). In this regard, system 100 may be a stand-alone system or part of a network, such as network 122. Those of ordinary skill in the art will appreciate that system 100 and DSD 106 can include more or less than those elements shown in FIG. 1 and that the disclosed processes can be implemented in other environments.

In the example embodiment of FIG. 1, DSDs 106, 107, 108, and 109 can be located in one location or can be separated at different locations. As shown in FIG. 1, DSD 106 is a part of host 101 and stores applications for execution on host 101, while DSDs 107, 108 and 109 primarily store user data of host 101.

Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 110 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein. CPU 110 interfaces with host bus 113. Also interfacing with host bus 113 are Random Access Memory (RAM) 112, input interface 114 for input device 102, display interface 116 for display device 104, Read Only Memory (ROM) 118, and network interface 120 for interfacing with network 122.

RAM 112 is a volatile memory of host 101 that interfaces with host bus 113 to provide information stored in RAM 112 to CPU 110 during execution of instructions in software programs such as device drivers 14 or Operating System (OS) 20. More specifically, CPU 110 first loads computer-executable instructions from DSD 106 into a region of RAM 112. CPU 110 can then execute the stored process instructions from RAM 112. Data such as data to be stored in DSDs 106, 107, 108, or 109, or data retrieved from DSDs 106, 107, 108 and 109 can also be stored in RAM 112 so that the data can be accessed by CPU 110 during execution of software programs to the extent that such software programs have a need to access and/or modify the data.

As shown in FIG. 1, DSD 106 can be configured to store one or more of: Garbage Collection (GC) manager 10, application 12, device drivers 14, file system 16, translation module 18, OS 20, and mapping table 28. GC manager 10 includes computer-executable instructions for DSDs 106, 107, 108 and 109 for performing garbage collection processes as discussed in more detail below.

In other embodiments, any one or more of GC manager 10, application 12, device drivers 14, file system 16, translation module 18, OS 20, or mapping table 28 can reside on DSDs 106, 107, 108, or 109. In one such example, GC manager 10 may reside at each of DSDs 106, 107, 108, and 109 so as to distribute execution of GC manager 10 throughout system 100.

Application 12 can include, for example, a program executed by host 101 that can request or modify user data stored in DSDs 107, 108, or 109, such as a data archiving program or multimedia program. Device drivers 14 provide software interfaces on host 101 for devices such as input device 102, display device 104, or DSDs 106, 107, 108, and 109. In addition, DSD 106 can store Operating System (OS) 20, which includes kernel 22, File System (FS) intercept 24, and storage stack 26. The contents of DSD 106 may be loaded into resident memory of host 101 (e.g., RAM 112) for execution and/or state tracking during operation of host 101.

File system (FS) 16 can be a file system implemented in a user space of host 101 with translation module 18 to interface with FS intercept 24, as described below in more detail with reference to the example implementation environment of FIG. 5.

DSD 106 can also store mapping table 28, which can be used to translate or map between logical addresses (e.g., logical block addresses) used by host 101 to refer to data and corresponding physical addresses (e.g., physical block address) indicating the location of data in DSDs 106, 107, 108 or 109. As discussed in more detail below with reference to FIG. 2, mapping table 28 may be used as part of an indirection system for Shingled Magnetic Recording (SMR) media or solid-state media to allow for the reassignment of logical addresses to different physical locations in DSDs 106, 107, 108, or 109.

As shown in FIG. 1, DSDs 107, 108, and 109 store user data 30, 33, and 34, respectively. The user data is data that is stored or accessed by host 101.

Figure 2:
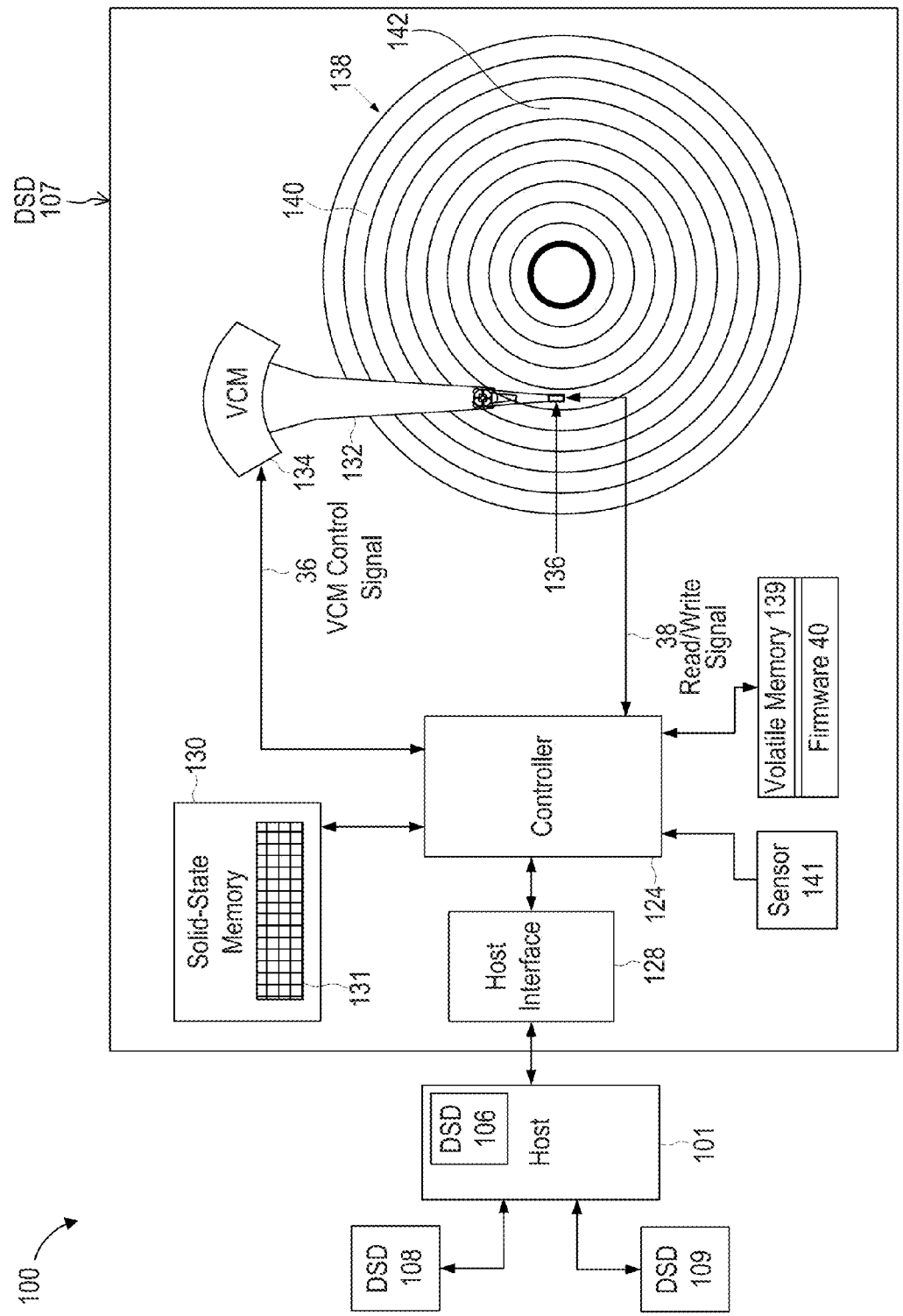
FIG. 2 is a block diagram including a Data Storage Device (DSD) of FIG. 1 according to an embodiment.

FIG. 2 depicts a block diagram of DSD 107 according to an embodiment. In the embodiment of FIG. 2, DSD 107 includes both solid-state memory 130 and disk 138 for storing data. In this regard, DSD 107 can be considered a Solid-State Hybrid Drive (SSHD) in that it includes both solid-state Non-Volatile Memory (NVM) media and disk NVM media. In other embodiments, each of disk 138 or solid-state memory 130 may be replaced by multiple Hard Disk Drives (HDDs) or multiple Solid-State Drives (SSDs), respectively, so that DSD 107 includes pools of HDDs or SSDs.

DSD 107 includes controller 124 which comprises circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 124 can include a System on a Chip (SoC).

Host interface 128 is configured to interface DSD 107 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 128 can be included as part of controller 124.

Sensor 141 is also connected to controller 124. Sensor 141 may provide controller 124 with an input indicating an environmental condition such as a high temperature or high vibration condition of DSD 107.

In the example of FIG. 2, disk 138 is rotated by a spindle motor (not shown). DSD 107 also includes head 136 connected to the distal end of actuator 132, which is rotated by Voice Coil Motor (VCM) 134 to position head 136 in relation to disk 138. Controller 124 can control the position of head 136 using VCM control signal 36.

As appreciated by those of ordinary skill in the art, disk 138 may form part of a disk pack with additional disks radially aligned below disk 138. In addition, head 136 may form part of a head stack assembly including additional heads with each head arranged to read data from and write data to a corresponding surface of a disk in a disk pack.

Disk 138 includes a number of radial spaced, concentric tracks (not shown) for storing data on a surface of disk 138. The tracks on disk 138 may be grouped together into zones of tracks with each track divided into a number of sectors that are spaced circumferentially along the tracks. In the example of FIG. 2, disk 138 includes zone 140 which can serve as a source portion and zone 142 which can serve as a destination portion for the relocation or Garbage Collection (GC) of data.

Disk 138 may include one or more zones with overlapping tracks resulting from SMR to increase the amount of data that can be stored in a given area on a disk. As noted above, SMR tracks are generally sequentially written to avoid affecting previously written data and can involve using an indirection system to ensure that data is sequentially written. When data is modified for a particular Logical Block Address (LBA), the indirection system allows the DSD to sequentially write the modified data to a new location and remap the LBA for the data from the previous location to the new location.

In an SMR storage system in which indirection is used, GC can be used to recapture space used by data that is obsolete. However, performing GC and the relocation of data can decrease a performance bandwidth of system 100 that may otherwise be available to host 101.

In view of the foregoing, the present disclosure provides a tunable approach to improve control over GC and the relocation of data. According to another aspect, some embodiments of the present disclosure also include data management processes and systems to reduce the performance impact of relocating data.

In addition to disk 138, the NVM media of DSD 106 also includes solid-state memory 130 with blocks 131 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

Solid-state memory 130 may use an indirection system to allow for the mapping of LBAs to different physical locations as part of a wear leveling process for a more even usage of blocks 131. In one implementation, modified data is written to a new physical location in solid-state memory 130 and the LBA for the data is remapped from a previous physical location to the new physical location. As with SMR media, solid-state memory 130 can also employ a GC process to recapture space used by data that is obsolete or no longer valid. Solid-state memory 130 can include a source or destination portion in the GC and data relocation processes discussed below. In some embodiments, DSD 107 may include solid-state memory 130, rotating magnetic media including disk 138, and/or a combination of both types of non-volatile storage.

In FIG. 2, volatile memory 139 can include, for example, a Dynamic Random Access Memory (DRAM), which can be used by DSD 107 to temporarily store data. Data stored in volatile memory 139 can include data read from NVM media (e.g., disk 138 or solid-state memory 130), data to be written to NVM media, instructions loaded from firmware 40 of DSD 107 for execution by controller 124, or data used in executing firmware 40. In this regard, volatile memory 139 in FIG. 2 is shown as storing firmware 40 which can include instructions for execution by controller 124 to implement the data relocation and garbage collection processes discussed below. Firmware may be stored in one of the non-volatile storage shown such as solid-state memory 130 and/or rotating magnetic media including disk 138.

In operation, DSD 107 receives read and write commands from host 101 via host interface 128 for reading data from and writing data to the NVM media of DSD 107. In response to a write command from host 101, controller 124 may buffer the data to be written for the write command in volatile memory 139.

For data to be stored in solid-state memory 130, controller 124 receives data from host interface 128 and may buffer the data in volatile memory 139. In one implementation, the data is then encoded into charge values for charging cells in solid-state memory 130 to store the data.

In response to a read command for data stored in solid-state memory 130, controller 124 in one implementation reads current values for cells in solid-state memory 130 and decodes the current values into data that can be transferred to host 101. Such data may be buffered by controller 124 before transferring the data to host 101 via host interface 128.

For data to be written to disk 138, controller 124 can encode the buffered data into write signal 38 which is provided to head 136 for magnetically writing data to the surface of disk 138.

In response to a read command for data stored on disk 138, controller 124 positions head 136 via VCM control signal 36 to magnetically read the data stored on the surface of disk 138. Head 136 sends the read data as read signal 38 to controller 124 for decoding, and the data is buffered in volatile memory 139 for transferring to host 101.

Example Garbage Collection and Data Relocation Processes

Figure 3A:
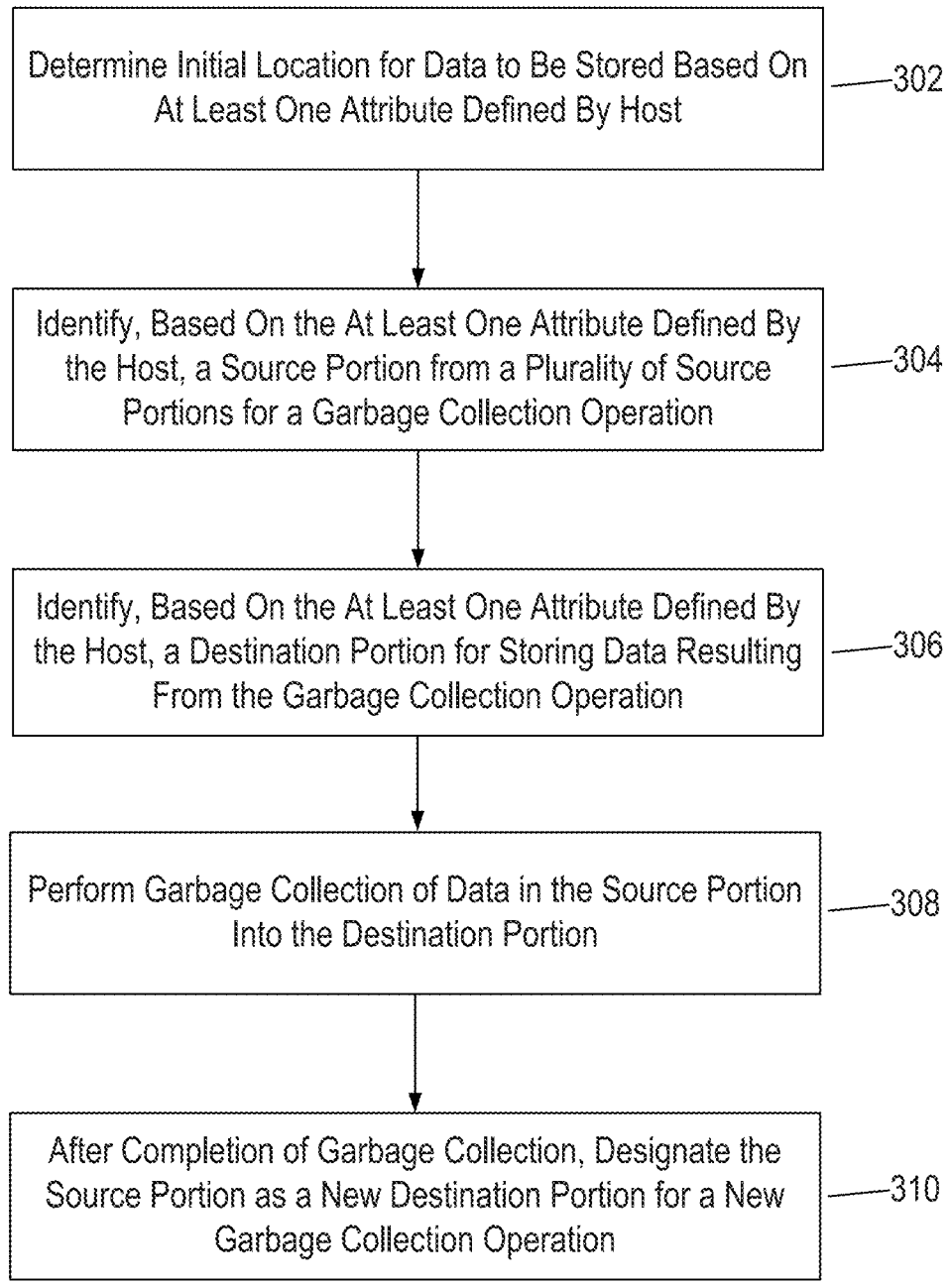
FIG. 3A is a flowchart for a Garbage Collection (GC) process according to an embodiment.

FIG. 3A is a flowchart for a garbage collection process that can be performed by either host 101 or by a DSD such as DSD 107 according to an embodiment. In block 302, an initial location is determined for data to be stored based on at least one attribute defined by host 101. Host 101 can use GC manager 10 to define at least one attribute or GC policy to tune or control where garbage collection should be performed (i.e., a source portion), when GC should be performed, where the valid data resulting from the GC should be relocated to (i.e., a destination portion), how to organize the relocated data in the destination portion, or where to initially store data during file creation.

Attributes that host 101 may define can include attributes of the data such as an expiration date for the data, a frequency of access of the data, ownership of the data, or a fragmentation level of the data. Host 101 may also define attributes that are conditions of a source portion that is garbage collected or conditions of a destination portion for storing valid data resulting from the GC operation.

For example, an attribute defined by host 101 may include a "data age" or expiration date used to determine whether certain data has expired. The data age or expiration date may be based on a data retention policy such as to remove all or substantially all files past a certain age or to remove files marked for deletion within a certain time period. In such an example, data may be grouped together by an expiration date so that data having the same expiration date are grouped together into one portion of system 100 (e.g., a particular logical volume, DSD, or portion of a DSD), so that the entire portion can be obsoleted at the same time without having to relocate much valid data.

In another example, host 101 may define an attribute based on a frequency of access of data (i.e., "hot/cold" attributes) so that data which is accessed less frequently (i.e., "cold data") can be grouped together in a portion of system 100 or so that data that is accessed more frequently (i.e., "hot data") is grouped together in a portion of system 100. More frequently accessed data often results in more data for GC than less frequently accessed data or data that needs to be relocated more frequently. Grouping frequently accessed data in one source portion can therefore ordinarily enhance the effect of a single GC operation since a single GC operation in a source portion of frequently accessed data would free up more space than multiple GC operations in source portions that do not contain as much invalid data. In other words, by grouping the more frequently accessed data together, it is ordinarily possible to precondition certain portions of system 100 for data relocation and thereby reduce an overall number of GC or data relocation operations.

In this regard, host 101 may also define an attribute to include considerations of a level of fragmentation in identifying a source portion for GC, such as an amount of capacity or performance that can be gained by performing GC in a particular source portion to provide the greatest capacity gain utilization.

Host 101 may also define an attribute for GC based on the ownership of data so that data owned by a particular user is grouped together in a portion of system 100. If the data of the user then needs to be deleted or relocated, the GC or relocation of that user's data is then more isolated to a particular portion of system 100 and can have less of an effect on system wide performance.

As noted above, host 101 executing GC manager 10 may also define an attribute based on a condition of a source or destination portion. Such conditions of the source or destination portions can include, for example, a reliability condition, an environmental condition, a wear level, an available data capacity, a distance from previous users of the data, a network bandwidth available between the source and destination portions, an availability of the source or destination portions, or an energy cost in operating the source or destination portions.

In one example, the attribute may include a reliability condition of the source portion or the destination portion such as a status of head 136 (e.g., a head that may need to be disabled) or a level of errors encountered when writing data on disk 138. In another example, the attribute defined by host 101 may identify source portions for garbage collection that have encountered a high level of errors so that data can be relocated to a destination portion with a lower level of errors.

In other examples, host 101 may define an attribute such that data is relocated from a source portion that has been utilized more often to a destination portion that has been utilized less (e.g., based on a wear level). This can ordinarily allow for a longer life for media such as solid-state media or can reduce the negative effects of repeatedly writing to the same location on disk media, as discussed in more detail below. Host 101 may also define an attribute based on an available data capacity so that data is relocated to a destination portion with a greater available data capacity.

In another example, host 101 may define an environmental condition such as a temperature or vibration condition such that data is relocated from a source portion experiencing a high temperature or high vibration condition to a destination portion experiencing a lower temperature or lower vibration condition.

The attribute or attributes may also take into consideration network considerations so that relocated data can be accessed quicker, the relocation of data is more efficient, or so that the data relocation has less of an impact on system performance. In one such example, host 101 defines the at least one attribute based on the location of previous users of data so that data is located to a closer physical location to the previous users of the data. Host 101 may also define an attribute so that there is a minimum network bandwidth between the source portion and the destination portion to improve the efficiency in relocating data in system 100.

The availability of the source or destination portions may also be considered. In such an example, host 101 may define an attribute based on an availability of the source or destination portions so that there is less activity or operations being performed at the source or destination portions.

In another implementation, an attribute may be defined by host 101 pertaining to a cost of operating the source and destination portions such that, for example, data is relocated from a source portion with a higher operating cost to a destination portion with a lower operating cost.

Returning to the process of FIG. 3A, in block 304, a source portion is identified based on the at least one attribute from a plurality of source portions for a GC operation. In an embodiment where GC manager 10 identifies a source portion, the source portion may be a particular logical volume, DSD, or a portion of a DSD in system 100. In an embodiment where a controller of a DSD (e.g., controller 124 of DSD 107) identifies a source portion, the source portion can be a portion of DSD 107 such as zone 140 on disk 138.

In block 306, a destination portion is identified based on the at least one attribute for storing data resulting from garbage collecting the source portion. In an embodiment where GC manager 10 identifies a destination portion, the destination portion may be a particular logical volume, DSD, or portion of a DSD in system 100. In an embodiment where a controller of a DSD identifies a destination portion, the destination portion can be a portion of the DSD such as zone 142 on disk 138.

In block 308, GC is performed in the source portion into the destination portion. As discussed above, GC can be performed by copying valid data from the source portion to the destination portion and freeing the invalid or obsolete areas in the source portion to be overwritten.

In block 310, the source portion is designated as a new destination portion for a new GC operation. By rotating the destination portion, it is ordinarily possible to reduce the likelihood of uneven wear on a particular portion of system 100 that is repeatedly used as a destination portion. Such rotation of the destination portion can also help mitigate problems associated with repeatedly writing in the same location on disk media such as Adjacent Track Interference (ATI) or Wide Area Track Erasure (WATER).

Figure 3B:
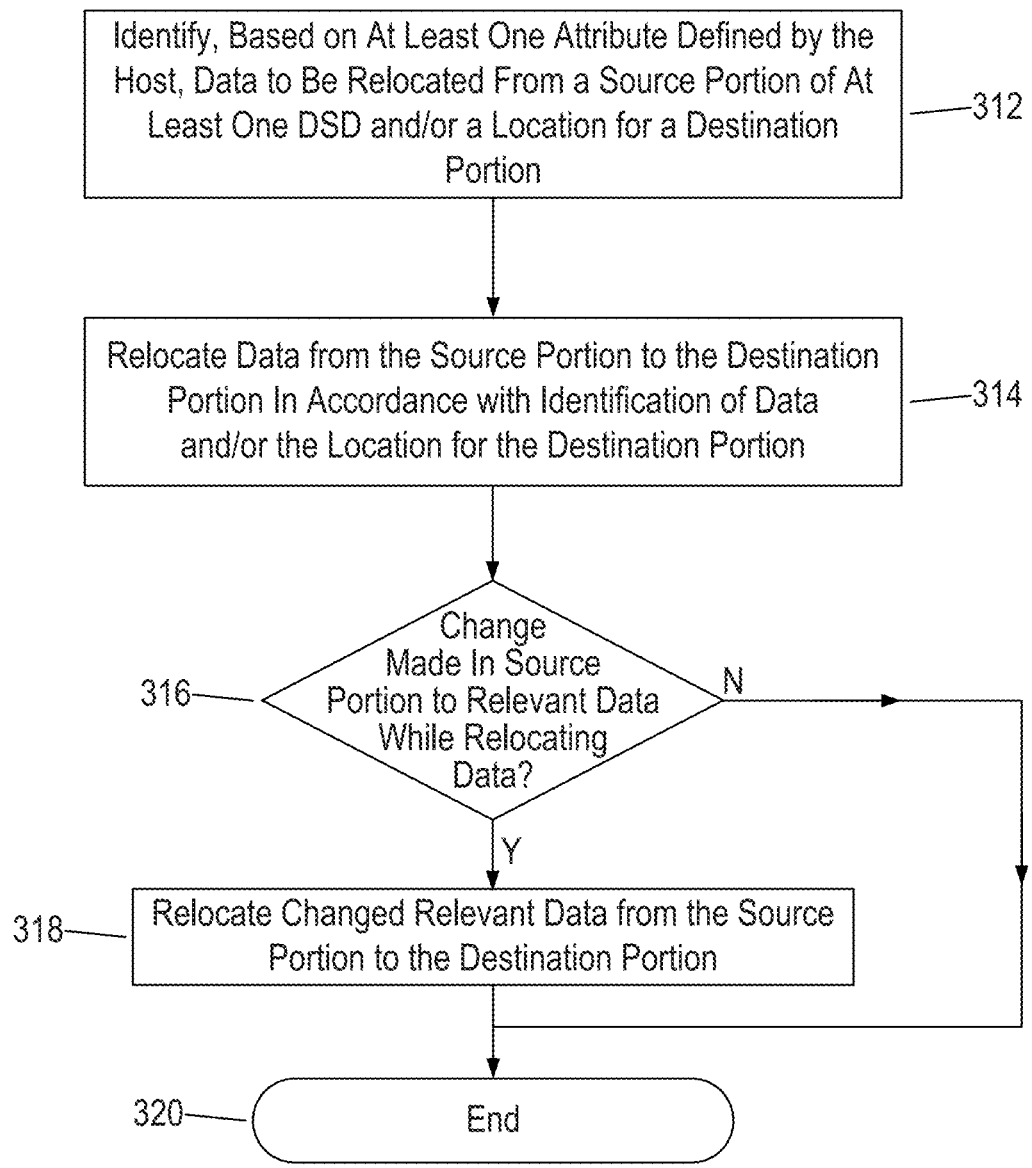
FIG. 3B is a flowchart for a data coherency process during data relocation according to an embodiment.

FIG. 3B is a flowchart for a data coherency process that can be performed by either host 101 or by a DSD such as DSD 107 according to an embodiment. This process can be performed in conjunction with the GC process of FIG. 3A or may be performed as part of another data relocation process to ensure coherency between the data being relocated from the source portion and the relocated data in the destination portion with a reduced impact on performance in the source portion.

In block 312, data to be relocated and/or a destination portion are identified based on an attribute defined by host 101. As discussed above with reference to FIG. 3A, the attribute can include an attribute of the data or a condition of system 100.

In block 314, data is relocated from a source portion to the destination portion in accordance with the identification of data and/or the location of the destination portion in block 312. The source portion and the destination portion may be in the same DSD such as with zones 140 and 142 in FIG. 2, or the source and destination portions may reside in or include different DSDs such as DSD 107 and DSD 108.

In block 316, it is determined whether a change was made in the source portion to relevant data while relocating data in block 314. Relevant data may include data that would have otherwise have been relocated in block 314. For example, changes to data in the source portion that were not identified for relocation in block 312 based on the at least one attribute would not be considered a change to relevant data. In some implementations, the changes can be determined based on comparing metadata from before and after relocating the data in block 314. The metadata may result from the use of a Copy On Write (COW)-based file system that generates a change in metadata when there is a change in a file. Scanning the metadata of the file system can then show whether changes took place and where.

If there was a change to relevant data in the source portion during relocation, the changed relevant data is relocated from the source portion to the destination portion in block 318 and the process ends in block 320.

The process of FIG. 3B ordinarily provides for coherency between the source and destination portions while still allowing for the performance of changes to data in the source portion while relocating data in block 314. In some embodiments, changes made to relevant data in the source portion may be blocked in block 318 to further ensure coherency between the data being relocated from source portion and the relocated data in the destination portion. If there was no change made to relevant data during relocation, the process ends in block 320 without performing block 318.

In other embodiments, controller 124 or host 101 may repeatedly perform blocks 316 and 318 until there is no change made to relevant data. With each iteration of blocks 316 and 318, less changes are expected since the time for relocating data should decrease. The process can end once there are no further changes to relevant data in the source portion.

Figure 4:
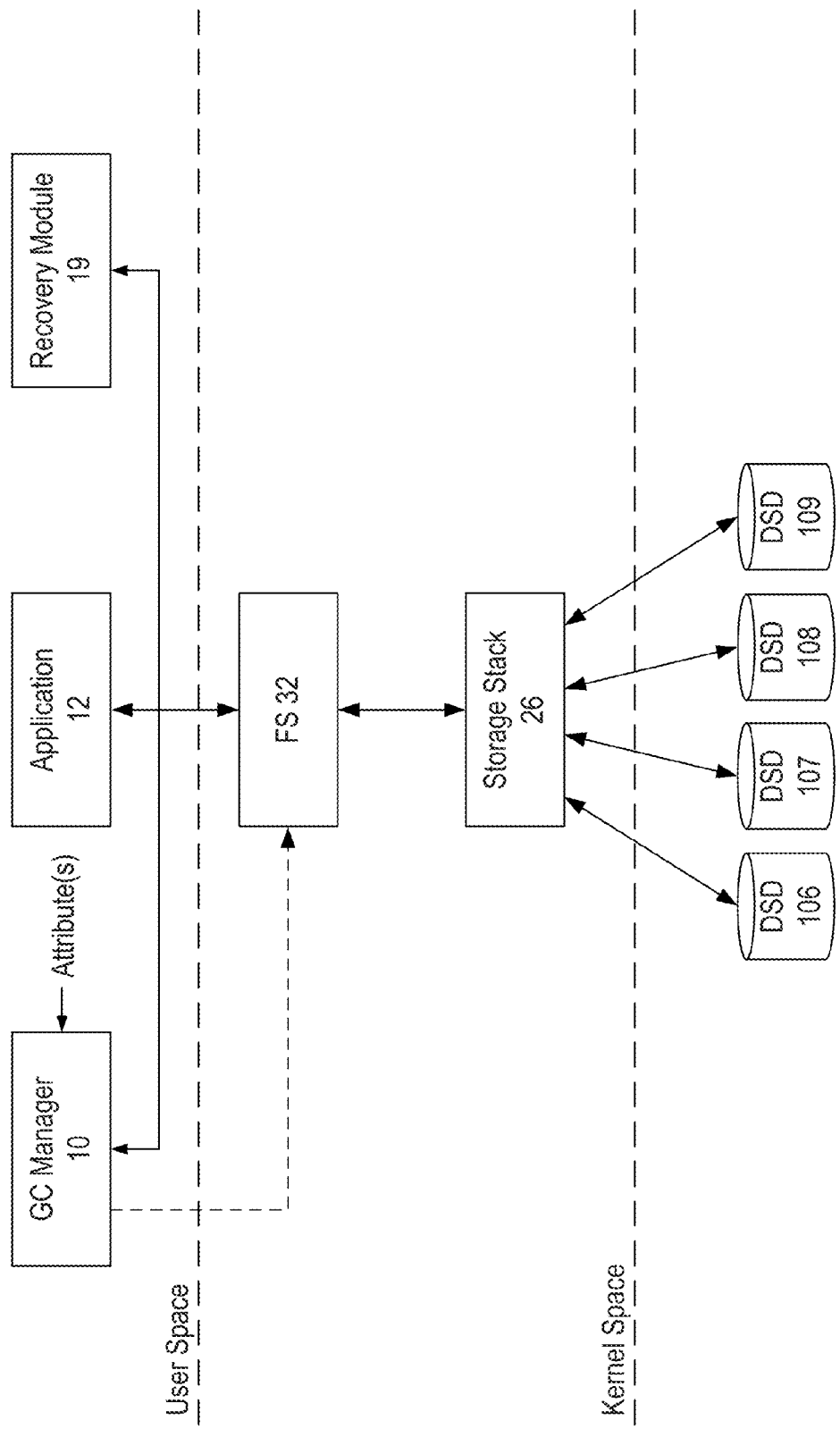
FIG. 4 is an implementation environment according to an embodiment.

FIG. 4 depicts an example implementation environment including host 101 and DSDs 106, 107, 108, and 109 according to an embodiment. As shown in FIG. 4, host 101 includes a user space and a kernel space.

The user space includes GC manager 10, application 12, and recovery module 19 for reconstructing a file system after an error. Recovery module 19 can include a recovery tool similar to Check Disk (CKDSK) or File System Consistency Check (FSCK), but on a system-wide level to handle inconsistencies or errors identified across different file systems and/or DSDs of system 100. In addition, recovery module 19 may consult with GC manager 10 for determining source or destination portions when relocating data.

As shown in FIG. 4, GC manager 10 takes in at least one attribute or policy that can include user tunable parameters for controlling GC or data relocation in the DSDs. As discussed above, the at least one attribute can include a condition of system 100 or an attribute of data stored in system 100. The at least one attribute can be used to identify a source portion of system 100, a destination portion, a time for performing GC or data relocation, or particular data to be relocated.

In determining when or where to perform GC, the GC policies or attributes can include an expected Input Output (IO) usage for the DSD such that GC can be performed on a drive when it is expected to have less IO usage so as to have less of an impact on system performance. A history of IO usage may come from information provided by host 101 or from a DSD in system 100. In another example, host 101 may define an attribute based on an IO usage associated with a time of day so that GC takes place when it would have less of an impact on system performance.

The at least one attribute may also consider an availability of system resources (e.g., processing, storage, or bandwidth) which can include evaluating a level of activity of host 101 in system 100. In one example, the at least one attribute may specify a level of connection resources between the source portion and the destination portion so as to reduce a time for relocating data.

With reference to FIG. 4, GC manager 10 can relocate data from the destination portion to the source portion and can also influence the data placement policies of the file system, as indicated by the dashed line from GC manager 10 to FS 32, which can include, for example, a file system such as Ext4 or NILFS in the kernel space. This can allow for determining an initial location for data to be stored in system 100 based on the at least one attribute defined by host 101. By initially grouping or consolidating data based on the at least one attribute, the relocation of data is usually made more efficient since the data is less dispersed across different portions of system 100.

In the embodiment shown, GC manager 10 sits above the file system layer and can query portions of system 100 to determine a time or portions for performing GC based on the at least one attribute. GC manager 10 may also include a lower level module that can execute the processes of FIGS. 3A and 3B. In this example where GC manager 10 sits above the file system layer, it can identify valid versus expired/deleted data without relying on SCSI/ATA hints or notifications (e.g., TRIM or UNMAP commands).

The kernel space can be part of OS 20 executed by host 101 and includes storage stack 26 for interfacing with and networking DSDs 106, 107, 108, and 109. FS 32 organizes data stored in system 100 by interfacing with storage stack 26. In addition, application 12 can use FS 32 to retrieve and store data in DSDs 106, 107, 108, and 109 as user data.

Figure 5:
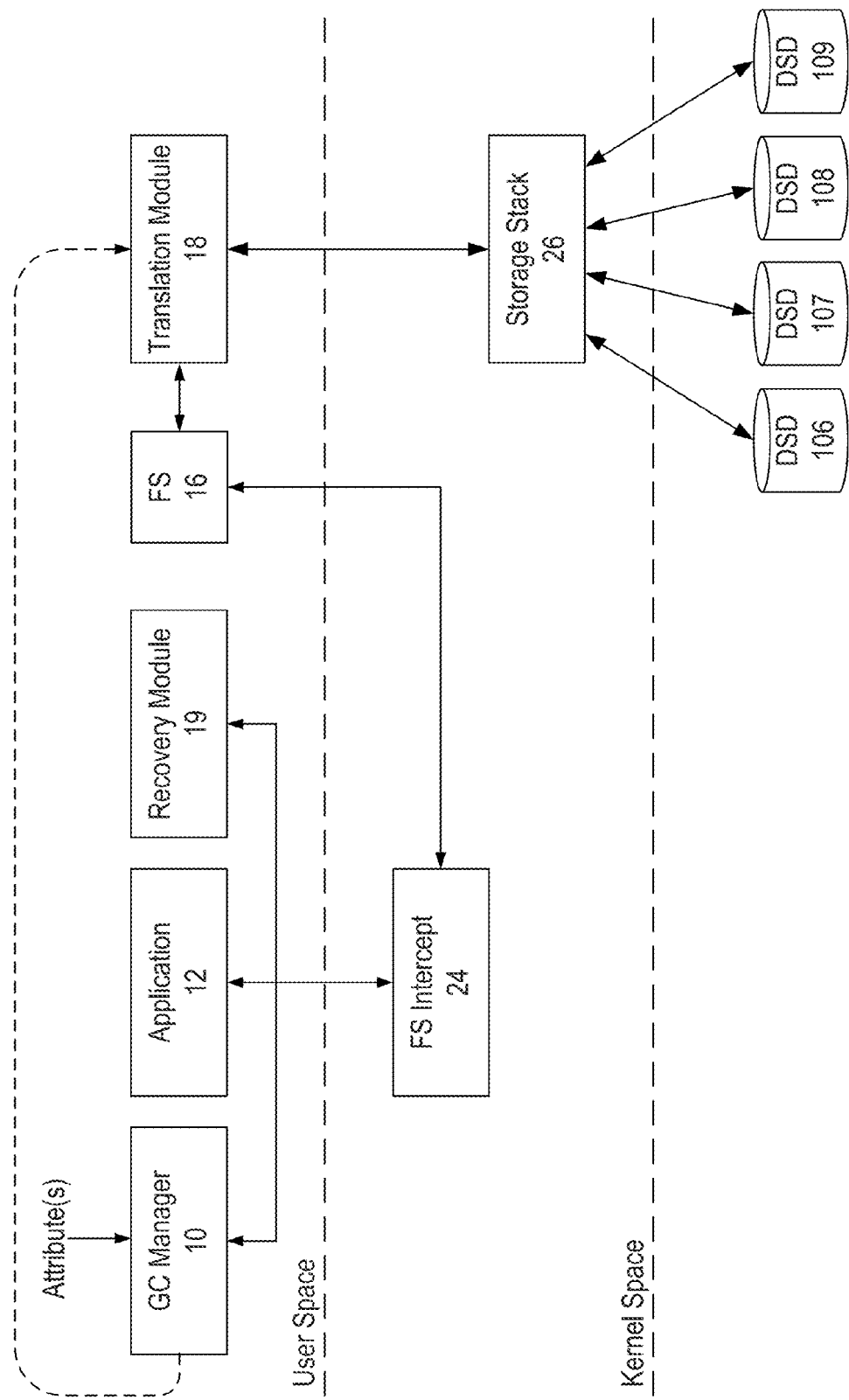
FIG. 5 is another implementation environment according to an embodiment.

FIG. 5 depicts another implementation environment including host 101 and DSDs 106, 107, 108, and 109 according to an embodiment. In the example of FIG. 5, host 101 executes GC manager 10, application 12, and recovery module 19, as with the example implementation environment of FIG. 4. Unlike the implementation environment of FIG. 4, the example of FIG. 5 also includes FS 16 and translation module 18 in the user space and FS intercept 24 in the kernel space.

FS intercept 24 interfaces with application 12 and can intercept read and write commands and pass the commands to FS 16 in the user space. FS 16 can include a file system implementing COW such as Linear Tape File System (LTFS). As noted above, a COW-based file system can allow for a relatively quick identification of changes to relevant data during data relocation by scanning the metadata of the file system for changes.

For its part, FS 16 generates commands that include a block address indicating a logical address for metadata or data associated with the command. The commands are accepted by translation module 18 which can translate the logical address into a device address for a particular DSD and/or translate between different interface protocols (e.g., ATA, SCSI). The device address can also identify a location in a zone of storage media (e.g., zone 142 of DSD 107).

Translation module 18 passes the translated device address to storage stack 26 with the respective read or write command for the storage media. In practice, translation module 18 can be a plug-in driver without requiring modification to FS 16.

Other embodiments may include a different system implementation than the examples shown in FIGS. 4 and 5. For example, in other embodiments, translation module 18 may instead be part of the kernel space. In this regard, some of the modules may be assigned to different layers/spaces than as shown, and some may be split into additional modules or combined into fewer modules.

Figure 6A:
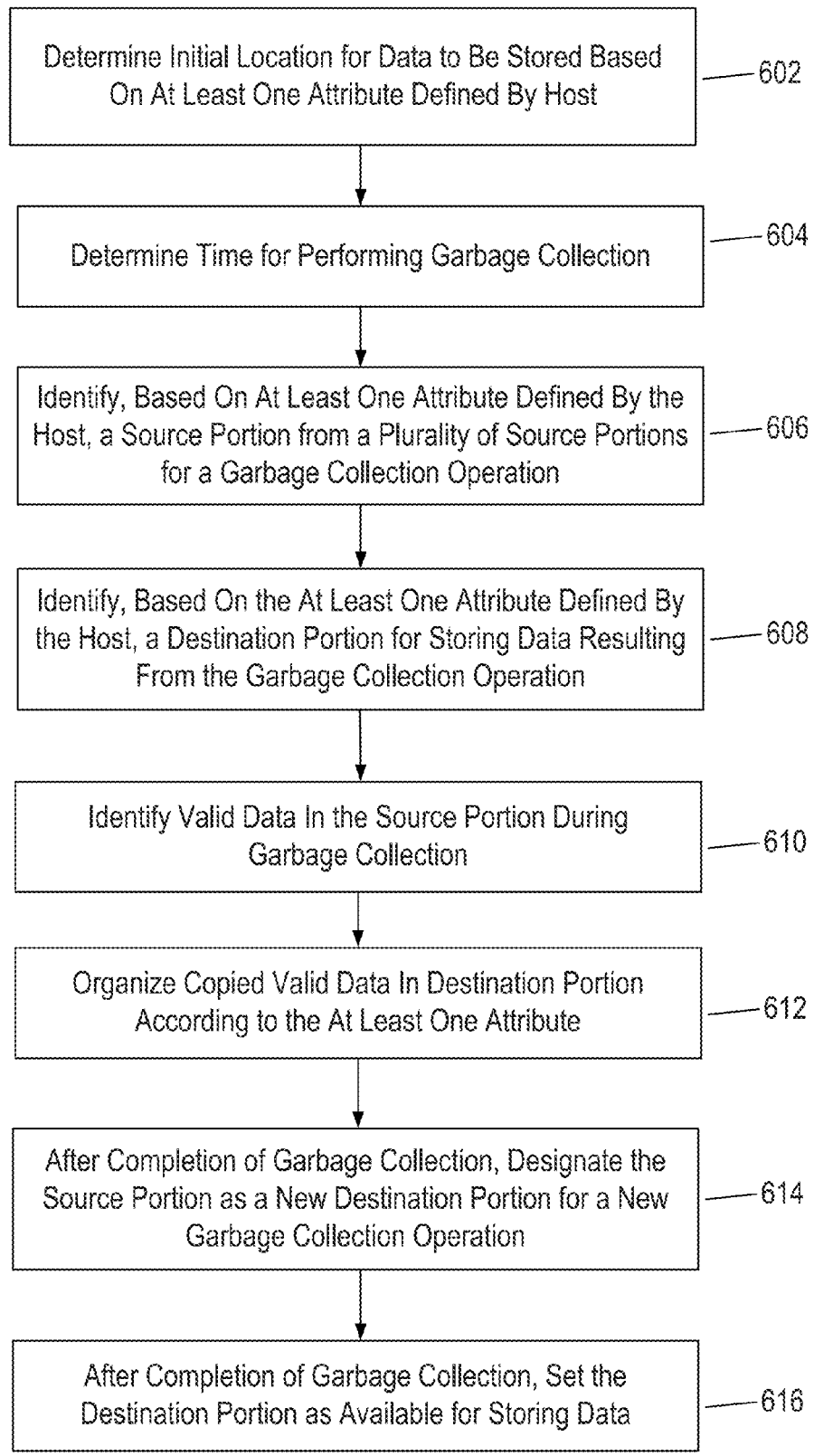
FIG. 6A is a flowchart for a GC process according to an embodiment.

FIG. 6A is a flowchart for a GC process that can be performed by either host 101 or by a DSD such as DSD 107 according to an embodiment. In block 602, an initial location is determined for data to be stored in system 100 based on at least one attribute defined by host 101. As noted above, this initial placement of data based on the at least one attribute can later improve the efficiency of GC or data relocation based on the at least one attribute since the relevant data for relocation is not spread across different locations in system 100.

In block 604, a time for performing GC is determined. The time for GC can be determined so as to reduce the impact on system IO performance. Thus, host 101 or a DSD controller such as controller 124 may determine when to perform GC based on an availability of processing resources, an availability of the source portion or the destination portion, a time of day, or a level of activity of host 101. In this regard, GC can take place at a time when there is expected to be less activity in servicing other host commands so that the GC has less of an effect on the performance of system 100 in servicing host commands. For example, the time for GC can be at a time of day that has historically had less activity so that the GC does not interfere with the servicing of commands from host 101. The IO usage patterns can be either learned by a DSD controller or can be observed/provided by host 101. In addition, host 101 or a DSD controller may postpone GC for a source portion if modifications are being made to relevant data in the source portion.

In block 606, a source portion is identified based on the at least one attribute from a plurality of source portions for a GC operation. In an embodiment where GC manager 10 identifies a source portion, the source portion may be a particular logical volume, DSD, or portion of a DSD in system 100. In an embodiment where a controller of a DSD such as controller 124 of DSD 107 identifies a source portion, the source portion can be a portion of DSD 107 such as zone 140 on disk 138.

In block 608, a destination portion is identified based on the at least one attribute for storing data resulting from garbage collecting the source portion. In an embodiment where GC manager 10 identifies a destination portion, the destination portion may be a particular logical volume, DSD, or portion of a DSD in system 100. Thus the source and destination portions may be on the same volume/DSD/portion of a DSD or on different volumes/DSDs/portions of a DSD. In an embodiment where controller 124 of DSD 107 identifies a destination portion, the destination portion can be a portion of DSD 107 such as zone 142 on disk 138.

In block 610, GC is performed by identifying valid data in the source portion. Valid data is data that is a most recent version of the data that has not been obsoleted. In block 612, the valid data is copied into the destination portion and organized according to the at least one attribute. In one example, the valid data may be organized so that the copied data within the destination portion is organized by an expiration date, frequency of access, or ownership of the data.

In block 614, the source portion is designated as a new destination portion for a new GC operation. As noted above with reference to FIG. 3A, rotating the destination portion can reduce uneven wear on a particular portion of system 100 that might otherwise be repeatedly used as a destination portion. Such rotation of the destination portion can also help mitigate problems associated with repeatedly writing in the same location on disk media such as Adjacent Track Interference (ATI) or Wide Area Track Erasure (WATER).

In block 616, the destination portion is set as available for storing data after completion of GC. This allows for the destination portion to be used for storing user data in addition to the copied data from the above GC process. In future GC operations, the destination portion may then serve as a source portion for performing GC.

Figure 6B:
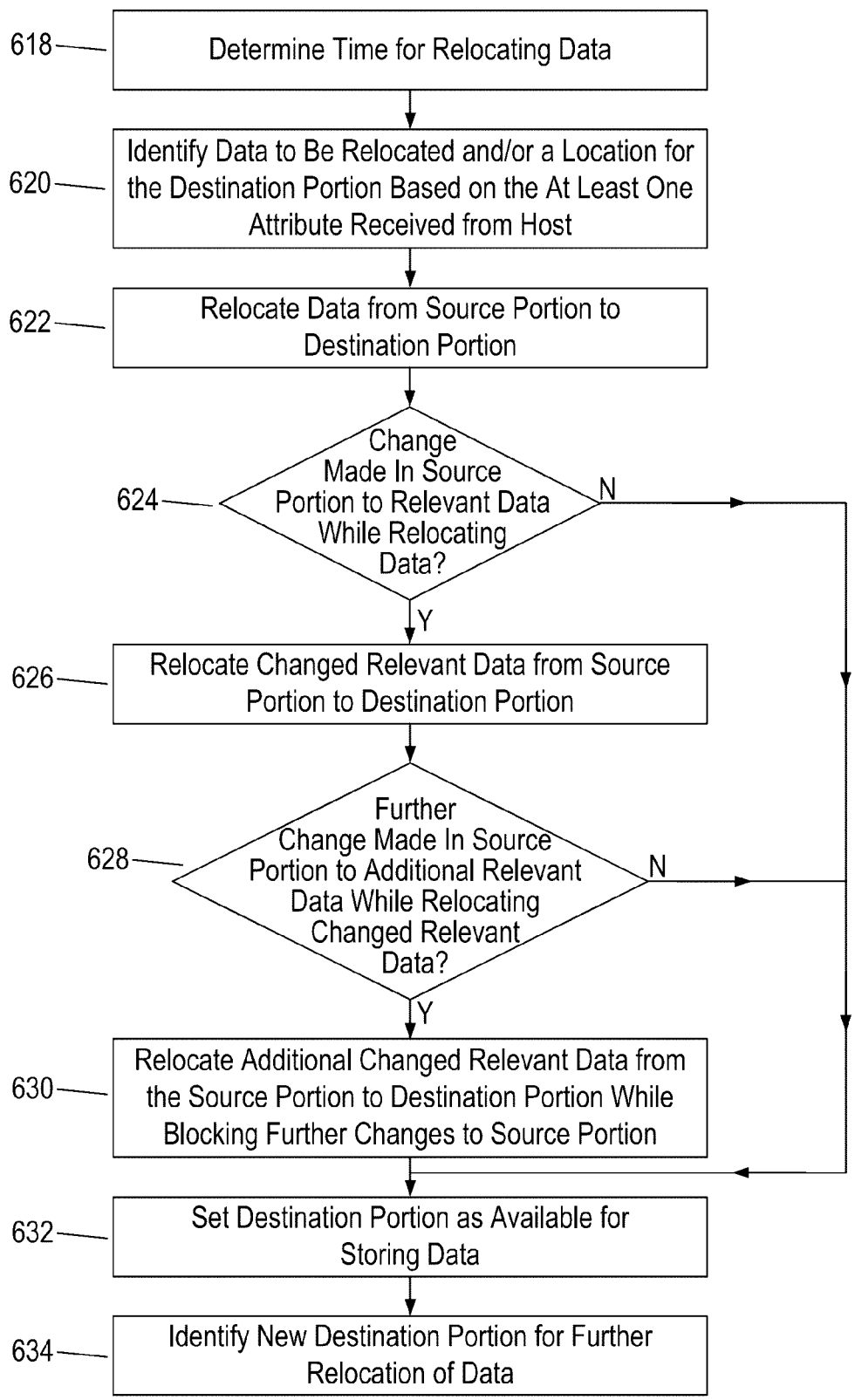
FIG. 6B is a flowchart for a data coherency process during data relocation according to an embodiment.

FIG. 6B is a flowchart for a data coherency process that can be performed by either host 101 or by a DSD such as DSD 107 according to an embodiment. This process can be performed in conjunction with the GC processes of FIG. 3A or 6A, or may be performed as part of another data relocation process to ensure coherency between the data being relocated from the source portion and the relocated data in the destination portion with a reduced impact on performance in the source portion.

In block 618, a time for relocating data is determined. As noted above, the time for data relocation can be determined so as to reduce the impact on system 10 performance. Thus, host 101 or a DSD controller such as controller 124 may determine when to relocate data based on an availability of processing resources, an availability of the source portion or the destination portion, a time of day, or a level of activity of host 101. In this regard, data relocation can take place at a time when there is expected to be less activity in servicing other host commands so that the data relocation has less of an effect on the performance of system 100 in servicing host commands. For example, the time for data relocation can be at a time of day that has historically had less activity so that the data relocation does not interfere with the servicing of commands from host 101. The IO usage patterns can be either learned by a DSD controller or can be provided by host 101. In addition, host 101 or a DSD controller may postpone GC for a source portion if modifications are being made to relevant data in the source portion.

In block 620, data to be relocated and/or a destination portion are identified based on an attribute defined by host 101. As discussed above, the attribute can include an attribute of the data or a condition of system 100.

In block 622, data is relocated from a source portion to the destination portion in accordance with the identification of data and/or the location of the destination portion in block 620. The source portion and the destination portion may be in the same DSD such as with zones 140 and 142 in FIG. 2, or the source and destination portions may reside in or include different DSDs such as DSDs 107 and 108.

In block 624, it is determined whether a change was made in the source portion to relevant data while relocating data in block 622. Relevant data can include data that would have otherwise have been relocated in block 622. For example, changes to data in the source portion to data that was not identified for relocation in block 620 based on the at least one attribute may not be considered a change to relevant data. In some implementations, the changes can be determined based on comparing metadata from before and after relocating the data. By not blocking changes in the source portion during the relocation of data, the performance of write commands to the source portion is not hindered by the relocation of data.

If there was no change made to relevant data during relocation in block 622, the process proceeds to block 632 to set the destination portion as available for storing data.

On the other hand, if there was a change to relevant data in the source portion during relocation in block 622, the changed relevant data is relocated from the source portion to the destination portion in block 626. As with block 622, the relocation of the changed relevant data does not prevent the performance of write commands in the source portion. Since the time to relocate any changed relevant data in block 626 is likely less than the time to initially relocate data in block 622, it is less likely that there are additional changes made to relevant data while relocating the changed relevant data in block 626.

Another check is performed in block 628 to determine if any changes were made to additional relevant data while relocating the changed relevant data in block 626. If so, the additional changed relevant data is relocated from the source portion to the destination portion in block 630 while blocking further changes to the source portion.

In other embodiments, there may be more iterations of blocks 624 and 626, or blocks 624 and 626 may be performed repeatedly until there are no changes made to relevant data in the source portion without blocking changes. This ordinarily allows for the IO performance of the source portion to remain generally unchanged during data relocation while maintaining coherency between the relevant data stored in the source and destination portions. With each iteration of blocks 624 and 626, less changes are expected since the time for relocating data should decrease.

In block 632, the destination portion is set as available for storing data. This allows for the destination portion to be used for storing user data in addition to the relocated data from the above data relocation process. In future data relocation operations, the destination portion may then serve as a source portion.

In block 634, a new destination portion is identified for the further relocation of data. The identification of the new destination portion can be based on the at least one attribute defined by host 101 without considering the previously used destination portion so that the destination portion rotates within system 100.

Figure 7:
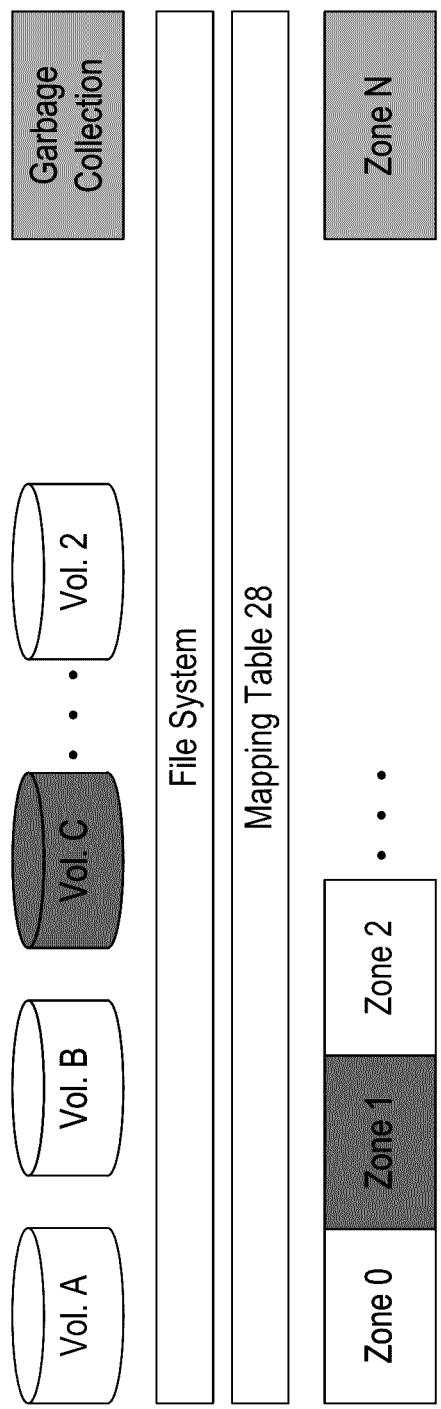
FIG. 7 is a conceptual diagram illustrating the assignment of zones to different logical volumes and the assignment of a zone as a destination portion according to an embodiment.

FIG. 7 is a conceptual diagram illustrating the assignment of a zone as a destination portion for GC and the assignment of each of the remaining zones as a logical volume used by host 101 for storing data according to an embodiment. In FIG. 7, zones 0, 1 and 2 are each mapped to volumes B, C, and A, respectively, via a file system for the zones and mapping table 28. In other embodiments, different zones may each use a different file system.

A single zone in FIG. 7 can include a particular physical portion of a disk such as zone 140 or zone 142 of disk 138, or a single zone can include a portion of a solid-state memory such as one or more blocks 131 in solid-state memory 130. In other embodiments, a single zone can comprise an entire disk surface or an entire DSD.

The shading of the volumes and the corresponding shading of the zones shows the mapping correspondence and the level of fragmentation for each of the volumes/zones. The darker shading of volumes/zones indicates a higher level of fragmentation for the volume/zone.

Zone N is a floating spare zone in FIG. 7 for storing data resulting from GC of another zone. For example, zone 1 may be garbage collected into zone N or any one or more of a set of floating spare zones along the lines of the GC process described above for FIG. 3A or 6A. After completing GC, zone N is mounted as the new volume C and zone 1 (previously mapped to volume C) is assigned as the new zone N for a subsequent GC operation. By rotating the destination portion, it is ordinarily possible to reduce wear on a particular zone used to store data resulting from GC. In addition, a particular zone with a lower use may be targeted or identified as the destination portion. The host defined attribute would then be based on a previous usage of the destination portion so that a zone with a lower usage or wear is identified as the destination portion. In other embodiments, zone N may include multiple zones for storing data resulting from GC.

Figure 8:
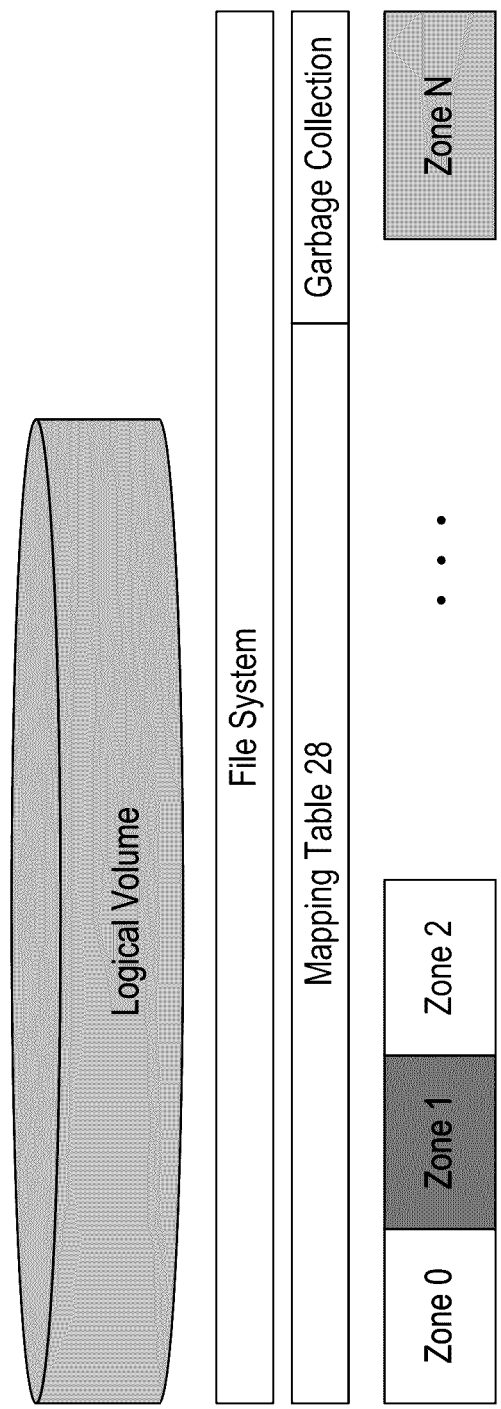
FIG. 8 is a conceptual diagram illustrating the assignment of multiple zones to a logical volume and the assignment of a zone as a destination portion according to an embodiment.

FIG. 8 is a conceptual diagram illustrating the assignment of multiple zones to a logical volume and the assignment of one zone as a destination portion for GC according to an embodiment. In FIG. 8, zones 0 to N-1 are mapped to a single logical volume. The mapping or assignment of multiple zones to a single logical volume can be used to accommodate large files whose size may otherwise exceed the size of a zone. Such large files may, for example, cover a disk platter surface and have a size of thousands of megabytes.

In other embodiments, a fewer number of zones may be mapped to a single logical volume. For example, a first pair of zones can be mapped to a first logical volume and a second pair of zones can be mapped to a second logical volume. In addition, other implementations can include GC of multiple zones into a single zone or GC of a single zone into multiple zones.

As with FIG. 7, a single zone in FIG. 8 can include a particular physical portion of a disk such as zone 140 or zone 142 of disk 138, or a single zone can include a portion of a solid-state memory such as one or more blocks 131 in solid-state memory 130. In other embodiments, a single zone can comprise an entire disk surface or an entire DSD.

In contrast to the implementation of FIG. 7, the implementation depicted in FIG. 8 can allow for the GC process to be hidden from the user level since it is outside of mapping table 28 and resides at a lower level than the file system.

The grey shading indicates that the fragmentation level of the entire volume is an average of the fragmentation level of the corresponding zones. A GC process as in FIG. 3A or 6A is performed at the zone level with zone N serving as a floating spare zone or destination portion which can rotate. Upon completion of a GC process, zone N can be mapped to the volume via the file system and mapping table 28 and one of the zones previously mapped to the logical volume is mapped out to serve as a new floating spare zone or destination portion.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for managing data in a data storage system including a host and at least one Data Storage Device (DSD) including a plurality of zones for storing data, the method comprising:
    assigning one or more zones of the plurality of zones as a destination portion in the at least one DSD for storing data resulting from a garbage collection operation;
    assigning multiple remaining zones of the plurality of zones as at least one logical volume used by the host for storing data, wherein the one or more zones assigned as the destination portion are outside of the at least one logical volume;
    identifying, based on at least one attribute defined by the host, a source portion for the garbage collection operation from a plurality of source portions in the multiple remaining zones assigned as the at least one logical volume; and
    performing garbage collection of data in the source portion into the destination portion.

2. The method of claim 1, further comprising:
    identifying valid data in the source portion during the garbage collection operation; and
    organizing the valid data in the destination portion according to the at least one attribute.

3. The method of claim 1, further comprising identifying valid data in the source portion during the garbage collection operation based on the at least one attribute such that the valid data is grouped together with other data in the destination portion having the at least one attribute.

4. The method of claim 1, wherein the at least one attribute includes at least one of an expiration date for the data, a frequency of access of the data, ownership of the data, or a fragmentation level of the data.

5. The method of claim 1, wherein the at least one attribute includes a reliability condition of the source portion or the destination portion, an environmental condition of the source portion or the destination portion, a wear level of the source portion or the destination portion, an available data capacity of the source portion or the destination portion, a distance of the source portion or the destination portion from previous users of the data, a network bandwidth available between the source portion and the destination portion, an availability of the source portion or the destination portion, or an energy cost in operating the source portion or the destination portion.

6. The method of claim 5, wherein the environmental condition of the source portion or the destination portion includes a temperature condition or a vibration condition.

7. The method of claim 5, wherein the reliability condition of the source portion or the destination portion includes a status of a head used for writing data or a level of errors encountered when writing data.

8. The method of claim 1, further comprising determining a time for performing garbage collection.

9. The method of claim 8, wherein determining the time for garbage collection is based on at least one of an availability of processing resources, an availability of the destination portion or the source portion, a time of day, or a level of activity for the host.

10. The method of claim 1, wherein after completion of garbage collection, the method further comprises setting the destination portion as available for storing data.

11. The method of claim 1, wherein the source portion and the destination portion are located in separate DSDs of the at least one DSD.

12. The method of claim 1, wherein the source portion and the destination portion are located in the same DSD of the at least one DSD.

13. The method of claim 1, further comprising:
    after performing garbage collection of data in the source portion into the destination portion, mapping at least one zone of the one or more zones assigned as the destination portion to the at least one logical volume;
    mapping at least one zone of the multiple remaining zones out of the at least one logical volume; and
    assigning the at least one zone mapped out of the at least one logical volume as a new destination portion.

14. A data storage system for storing data, the data storage system comprising:
    a host including a processor; and
    at least one Data Storage Device (DSD) in communication with the host, the at least one DSD including a plurality of zones for storing data;
    wherein the processor is configured to:
        define at least one attribute for performing garbage collection in the at least one DSD;
        assign one or more zones of the plurality of zones as a destination portion in the at least one DSD for storing data resulting from a garbage collection operation;
        assign multiple remaining zones of the plurality of zones as at least one logical volume used by the host for storing data, wherein the one or more zones assigned as the destination portion are outside of the at least one logical volume;
        identify, based on at least one attribute, a source portion for the garbage collection operation from a plurality of source portions in the multiple remaining zones assigned as the at least one logical volume; and
        perform garbage collection of data in the source portion into the destination portion.

15. The data storage system of claim 14, wherein the processor is further configured to:
    identify valid data in the source portion during the garbage collection operation; and
    organize the valid data in the destination portion according to the at least one attribute.

16. The data storage system of claim 14, wherein the processor is further configured to identify valid data in the source portion during the garbage collection operation based on the at least one attribute such that the valid data is grouped together with other data in the destination portion having the at least one attribute.

17. The data storage system of claim 14, wherein the at least one attribute includes at least one of an expiration date for the data, a frequency of access of the data, ownership of the data, or a fragmentation level of the data.

18. The data storage system of claim 14, wherein the at least one attribute includes a reliability condition of the source portion or the destination portion, an environmental condition of the source portion or the destination portion, a wear level of the source portion or the destination portion, an available data capacity of the source portion or the destination portion, a distance of the source portion or the destination portion from previous users of the data, a network bandwidth available between the source portion and the destination portion, an availability of the source portion or the destination portion, or an energy cost in operating the source portion or the destination portion.

19. The data storage system of claim 18, wherein the environmental condition of the source portion or the destination portion includes a temperature condition or a vibration condition.

20. The data storage system of claim 18, wherein the reliability condition of the source portion or the destination portion includes a status of a head used for writing data or a level of errors encountered when writing data.

21. The data storage system of claim 14, wherein the processor is further configured to determine a time for performing garbage collection.

22. The data storage system of claim 21, wherein the processor is further configured to determine the time for garbage collection based on at least one of an availability of processing resources, an availability of the destination portion or the source portion, a time of day, or a level of activity for the host.

23. The data storage system of claim 14, wherein the processor is further configured to set the destination portion as available for storing data after completion of the garbage collection.

24. The data storage system of claim 14, wherein the source portion and the destination portion are located in separate DSDs of the at least one DSD.

25. The data storage system of claim 14, wherein the source portion and the destination portion are located in the same DSD of the at least one DSD.

26. The data storage system of claim 14, wherein the processor is further configured to:
    after performing garbage collection of data in the source portion into the destination portion, map at least one zone of the one or more zones assigned as the destination portion to the at least one logical volume;
    map at least one zone of the multiple remaining zones out of the at least one logical volume; and
    assigning the at least one zone mapped out of the at least one logical volume as a new destination portion.

27. A Data Storage Device (DSD) in communication with a host, the DSD comprising:
    a non-volatile memory including a plurality of zones for storing data; and
    a controller configured to:
        receive at least one attribute defined by the host for performing garbage collection in the non-volatile memory;
        assign one or more zones of the plurality of zones as a destination portion in the at least one DSD for storing data resulting from a garbage collection operation;
        assign multiple remaining zones of the plurality of zones as at least one logical volume used by the host for storing data, wherein the one or more zones assigned as the destination portion are outside of the at least one logical volume;
        identify, based on the at least one attribute defined by the host, a source portion for the garbage collection operation from a plurality of source portions in the multiple remaining zones assigned as the at least one logical volume; and
        perform garbage collection of data in the source portion into the destination portion.

28. The DSD of claim 27, wherein the controller is further configured to:
    identify valid data in the source portion during the garbage collection process; and
    organize the valid data in the destination portion according to the at least one attribute.

29. The DSD of claim 27, wherein the controller is further configured to identify valid data in the source portion during the garbage collection process based on the at least one attribute such that the valid data is grouped together with other data in the destination portion having the at least one attribute.

30. The DSD of claim 27, wherein the at least one attribute includes at least one of an expiration date for the data, a frequency of access of the data, ownership of the data, or a fragmentation level of the data.

31. The DSD of claim 27, wherein the at least one attribute includes a reliability condition of the source portion or the destination portion, an available data capacity of the source portion or the destination portion, an availability of the source portion or the destination portion, or a wear level of the source portion or the destination portion.

32. The DSD of claim 31, wherein the reliability condition of the source portion or the destination portion includes a status of a head used for writing data or a level of errors encountered when writing data.

33. The DSD of claim 27, wherein the controller is further configured to determine a time for performing garbage collection.

34. The DSD of claim 33, wherein the controller is further configured to determine the time for garbage collection based on at least one of an availability of processing resources, an availability of the destination portion or the source portion, a time of day, or a level of activity for the host.

35. The DSD of claim 27, wherein the controller is further configured to set the destination portion as available for storing data after completion of the garbage collection.

36. The DSD of claim 27, wherein the controller is further configured to:
    after performing garbage collection of data in the source portion into the destination portion, map at least one zone of the one or more zones assigned as the destination portion to the at least one logical volume;
    map at least one zone of the multiple remaining zones out of the at least one logical volume; and
    assign the at least one zone mapped out of the at least one logical volume as a new destination portion.

* * * * *